C. NUHRING.
HOSE SUPPORT.
APPLICATION FILED OCT. 27, 1908.
1,045,069.
Patented Nov. 19, 1912.
2 SHEETS—SHEET 1.
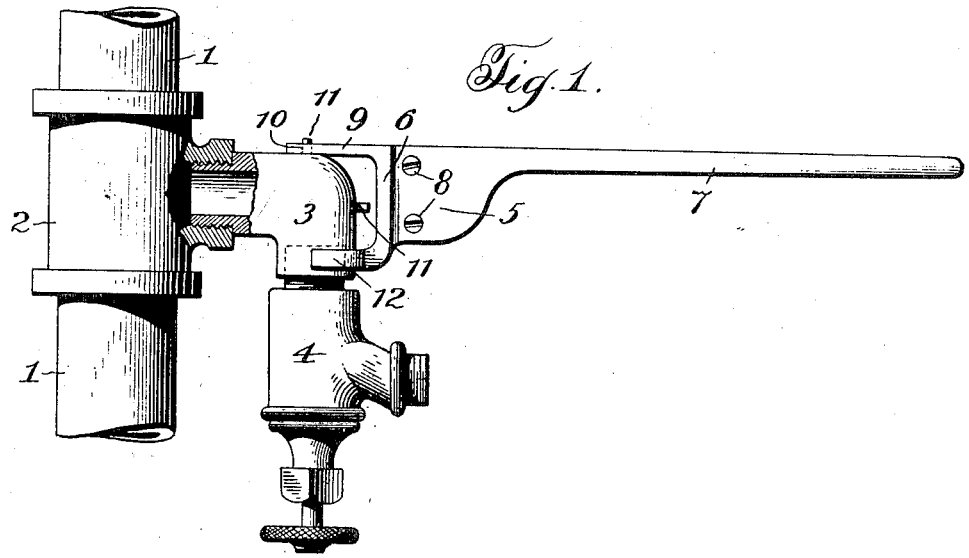
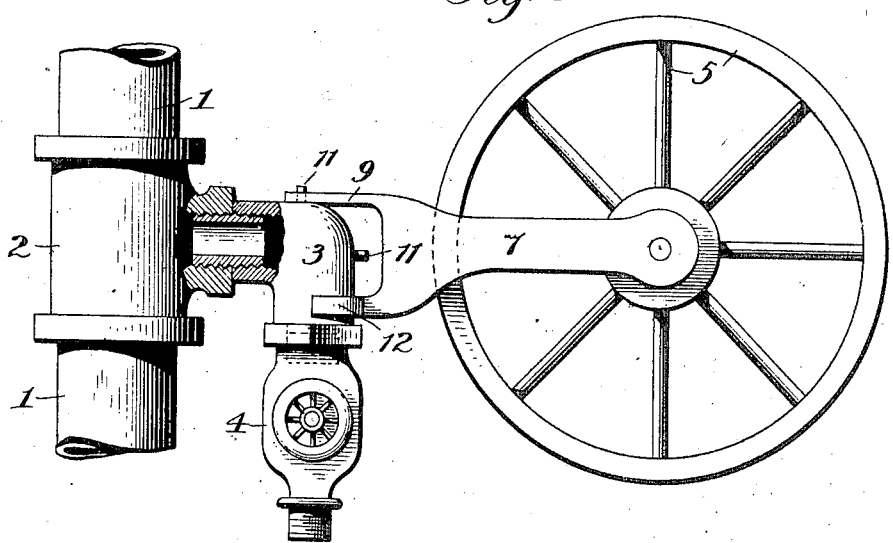
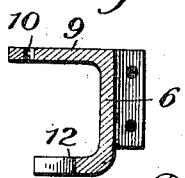
Witnesses:
Jas. E. Hutchinson
N. E. Smith
Inventor:
Charles Nuhring
by Wm. N. Cromwell Attorney.

C. NUHRING.
HOSE SUPPORT.
APPLICATION FILED OCT. 27, 1908.
1,045,069.
Patented Nov. 19, 1912.
2 SHEETS—SHEET 2.
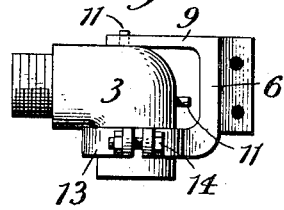
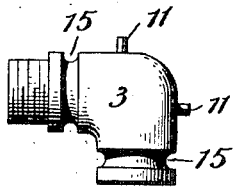
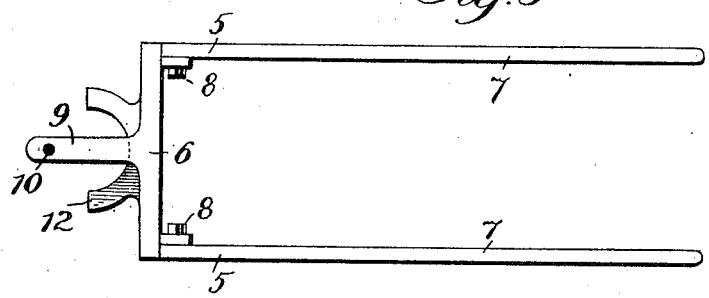
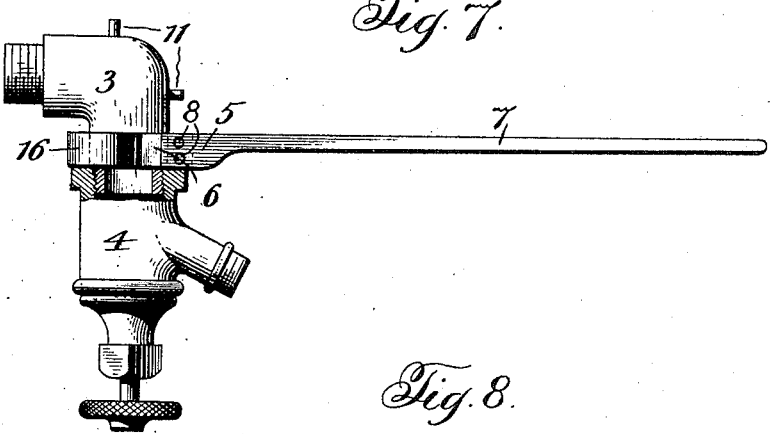
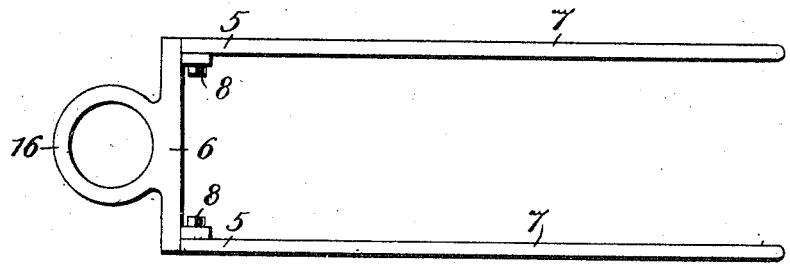
Witnesses:
Jas. E. Hutchinson
N. E. Smith
Inventor:
Charles Nuhring
By
Attorney.

UNITED STATES PATENT OFFICE.

CHARLES NUHRING, OF CINCINNATI, OHIO.

HOSE-SUPPORT.

1,045,069.  Specification of Letters Patent.  Patented Nov. 19, 1912.

Application filed October 27, 1908. Serial No. 459,672.

*To all whom it may concern:*

Be it known that I, CHARLES NUHRING, a citizen of the United States, residing at Cincinnati, in the county of Hamilton and State of Ohio, have invented certain new and useful Improvements in Hose-Supports; and I do hereby declare the following to be a full, clear, and exact description of the invention, such as will enable others skilled in the art to which it appertains to make and use the same.

This invention relates to improvements in hose supports, and is more particularly related to supports for sustaining fire hose in position for use.

Various forms of hose supporting devices have been provided. Many of these, however, are cumbersome in construction, preventing their practical use in locations where but limited space is allotted for the support, and being restricted in their application to pipes that are exposed. With the advent of modern office buildings, and similar structures, the service pipes of fire extinguishing apparatus have become positioned within the walls to prevent the unsightly appearance of the exposed pipes, and this concealment of the service pipes has presented a problem in supporting the hose without defacing or marring the walls by the application thereto of wall plates, clamping devices, etc.

It is therefore the object of the present invention to provide a hose support, whether in the form of a rack or a reel, that will meet the present-day needs; which will permit its application in locations where space is restricted, and hence requiring close work in positioning the support, and which will be capable of use either with exposed or concealed service pipes; the invention further aiming to provide a support that will be exceedingly simplified over prior structures, and which will be reversible in its application, whereby any form of standard valve may be employed therewith without utilizing special fittings adapting such employment.

With these general objects in view, the invention consists substantially in the novel construction, combination and arrangement of parts hereinafter fully described, illustrated in the accompanying drawings, and pointed out in the appended claims, the invention also having other objects in view which will appear as the nature of the improvements is better understood.

In the drawings Figure 1 is a side elevation of a hose support constructed in accordance with, and embodying the principles of, the present invention, this form of the invention embodying a rack for the support of the hose, the view being slightly in section. Fig. 2 is a similar view, the invention being illustrated as embodying a reel for the support of the hose. Fig. 3 is a detail elevation of the supporting head. Fig. 4 is a similar view illustrating another form thereof. Fig. 5 is a top plan view of the supporting head illustrated in Fig. 3. Fig. 6 is also a detail view illustrating another form of the elbow. Fig. 7 is a side elevation of another form of the support. Fig. 8 is a top plan view of the form illustrated in Fig. 7.

Referring in detail to the drawings, and more particularly to Figs. 1 and 2 thereof, the numeral 1 designates a service pipe, such as is employed in connection with fire extinguishing apparatus in buildings, the same being in the form of a stand pipe or riser, and including a T-connection 2 by which the water may be led from the pipe 1 to the extinguishing appliances. Connected to the T-connection 2 is an elbow 3 one end of which is provided preferably with a male thread, while the other end is provided with a female thread, and it is immaterial which of these ends is engaged with the T-connection 2. In Fig. 1, however, it will be observed that the end provided with the male thread is engaged with the connection 2, while in Fig. 2 the female threaded end is so engaged, and if the T-connection 2 is not provided with a male thread, a threaded nipple may be inserted into the T-connection 2, whereby the female threaded end of the elbow 3 may be engaged with said T-connection. At the opposite end of the elbow 3 is arranged a controlling valve 4. Any standard form of valve may be employed for this purpose, Fig. 1 illustrating the use of an angle valve, while Fig. 2 discloses the employment of a globe or gate valve. If the valve 4 is provided with a male thread, the elbow 3 is positioned as illustrated in Fig. 1, and reversed in such position, as illustrated in Fig. 2, if the valve 4 is provided with a female thread, so that a mere reversal in the position of the elbow 3 adapts the latter for attachment thereto of either a male or female threaded valve.

Associated with the elbow 3 is a support proper 5. This may either be a rack, as shown in Fig. 1, or a reel, as illustrated in Fig. 2, and this support proper comprises a supporting head 6 from which extend parallel arms 7, said arms being connected to the head 6 through the medium screws 8, or their equivalent, as disclosed in Fig. 1, or said arms 7 may be integral with the head 6, as illustrated in Fig. 2. The head 6 is provided with an outwardly-extending arm 9, which arm has a perforation 10 therein for receiving one of a pair of pivotal studs 11 carried by the elbow 3. These studs project at right angles to each other, so that when either end of the elbow 3 is engaged with the T-connection 2, one of the studs 11 will always be at the top of the elbow and in a position to form a pivot for the support proper 5. The head 6 is also provided with a curved guide yoke 12, said guide conforming to the surface contour of the elbow 3, and said guide embraces the elbow 3, and is concentric to the pivotal lug 11, so that as the support proper swings around said pivot the guide 12 will also move around the depending portion of the elbow 3, thus bracing the support proper 5, and enabling the latter to suspend the hose without sagging, or interfering with the free pivotal action of the supporting head 6 upon the elbow 3. If desired, a clamping strap 13 may be employed in connection with the guide 12, said strap being detachably connected to the guide 12 through the medium of screws or bolts 14, and when this strap is employed it is obvious that the same and the guide 12 completely encircle the depending portion of the elbow 3.

In Fig. 6 is illustrated another form of the elbow 3. This, however, is essentially the same as illustrated in the other views, but the form illustrated in Fig. 6 is provided with an annular groove adjacent each end of the elbow 3, said groove being designated by the numeral 15. These grooves are equidistant from the lugs 11, so that the guide 12 will rest in each of these grooves, and be supported thereby, irrespective of the fact that the elbow 3 may be reversed in its position upon the T-connection 2.

In Fig. 7 is illustrated a slightly modified form of the hose support. This includes the elbow 3, the support proper 5, and the controlling valve 4, but in lieu of suspending the support proper from the pivotal lugs of the elbow 3 the supporting head 6 is provided with an eye 16 which receives the lower depending vertical arm of the elbow 3, and is held in position thereon by the controlling valve 4. Thus it will be seen that the support proper is mounted directly upon the elbow 3, and is capable of swinging therearound, being prevented from becoming displaced therefrom in a downward direction by the valve 4, and in an upward direction by the horizontal arm of the elbow 3. The elbow 3, therefore, is capable of use either with the support proper 6 disclosed in Figs. 1 and 2, or with that form disclosed in Figs. 7 and 8, and by reason of the elbow 3 being connected to the T-connection 2, the support proper is sustained from the stand pipe 1, whether the latter be concealed in a wall, or exposed.

The use of the invention herein described is perfectly obvious, but, in brief, it will be seen that the hose may be suspended thereby either in pendant loops, by means of the rack illustrated in Figs. 1, 7 and 8, or in coil form, as by the use of the reel illustrated in Fig. 2. In the construction disclosed in Figs. 1 and 2, the support proper is freely detachable from the elbow 3, and with the perforated arm 9 engaged with one of the lugs 11, and the guide 12 resting against the depending arm of the elbow, the support proper may be freely swung upon the elbow, and expeditiously removed therefrom should the occasion arise requiring detachment of the support proper from the elbow.

In the use of the form illustrated in Figs. 7 and 8, the support proper may be readily applied to and detached from the elbow 3 by merely removing the valve 4 from the elbow, this permitting the eye 16 to receive or be removed from the depending arm of the elbow.

The herein described invention provides a simple form of support applicable to both concealed and exposed stand pipes; one that obviates the use of wall plates, clamping attachments, etc., and thus rendering the same especially applicable in connection with concealed stand pipes, and one which may be used in localities where but restricted space is allotted for hose supporting devices. With the form of elbow employed, the same is capable of universal application, by reason of its reversibility, and any form of standard valve may, therefore, be employed without utilizing special fittings to adapt such employment.

Having thus described the invention, what is claimed as new, and desired to be secured by Letters Patent, is:

1. In a hose support, the combination with an elbow having means at one end for attachment to a service pipe, and a controlling valve connected to its other end, of swinging hose supporting means journaled on the elbow between said attaching means and valve.

2. In a hose support, the combination with an elbow having substantially horizontal means at its upper end for attachment to a service pipe, and a controlling valve connected to and depending from its lower end, of a swinging hose supporting device journaled on the elbow between the attaching means and the valve.

3. In a hose support, the combination with an elbow for connection to a service pipe, said elbow being provided with a pivot pin disposed in alinement with one arm thereof, of a freely-detachable hose supporting device pivoted on said pin and having a guide yoke bearing against the periphery of the elbow, said guide yoke being open and arranged in concentric relation to said pin.

4. In a hose support, the combination with a reversible elbow having means to permit its attachment to a service pipe, said elbow having a pair of pivotal lugs arranged at right angles to each other, of a support proper associated with said elbow and engaging one of said lugs, whereby the support proper is mounted to swing on the elbow.

In testimony whereof I affix my signature, in the presence of two witnesses.

CHARLES NUHRING.

Witnesses:
ROBERT NUHRING,
Z. G. A. HAWORTH.